(12) United States Patent
Shea

(10) Patent No.: US 6,693,438 B2
(45) Date of Patent: Feb. 17, 2004

(54) SELF-POWERED APPARATUS AND METHOD FOR OPTICALLY DETECTING ARCING FAULTS IN ELECTRIC POWER SYSTEMS IN THE PRESENCE OF OTHER LIGHT SOURCES

(75) Inventor: John Joseph Shea, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 68 days.

(21) Appl. No.: 10/080,040

(22) Filed: Feb. 12, 2002

(65) Prior Publication Data

US 2003/0151414 A1 Aug. 14, 2003

(51) Int. Cl.[7] .............................. H01H 31/02; H02H 3/00
(52) U.S. Cl. ............................ 324/555; 324/556; 361/42
(58) Field of Search ................................ 324/555, 556, 324/752, 753; 361/1, 2, 14, 42, 78

(56) References Cited

U.S. PATENT DOCUMENTS

| | | | |
|---|---|---|---|
| 4,366,434 A | * 12/1982 | Ellis | ............................ 324/556 |
| 4,369,364 A | 1/1983 | Kuntermann | |
| 4,702,553 A | 10/1987 | Buchmüller et al. | |
| 4,791,518 A | 12/1988 | Fischer | |
| 4,878,144 A | 10/1989 | Nebon | |
| 5,223,682 A | 6/1993 | Pham et al. | |
| 5,650,902 A | 7/1997 | Herkenrath et al. | |
| 6,141,192 A | * 10/2000 | Garzon | .......................... 361/5 |
| 6,229,680 B1 | 5/2001 | Shea | |
| 6,433,976 B1 | * 8/2002 | Phillips | ........................ 361/42 |

FOREIGN PATENT DOCUMENTS

JP          2000065887          * 3/2000

* cited by examiner

*Primary Examiner*—N. Le
*Assistant Examiner*—Timothy J. Dole
(74) *Attorney, Agent, or Firm*—Martin J. Moran

(57) ABSTRACT

Arcing faults in an electric power system are detected by sensors powered by the light generated by the arcing even in the presence of background light. The sensors have one or more first photovoltaic cells energized by light passed through a first filter having a passband which includes a characteristic wavelength of the arcing material to generate a sensed light electrical signal. One or more second photovoltaic cells are energized by light filtered by a second filter having a passband not including the characteristic wavelength to generate a background light electrical signal. These two electrical signals are applied in opposition to an LED which is turned on when arcing is present. The light signal from the LED is transmitted through an optic fiber to a photoelectric circuit, which generates an arcing signal when energized. The LED may be biased toward the on condition by unfiltered additional photovoltaic cells.

11 Claims, 4 Drawing Sheets

SELF-POWERED APPARATUS AND METHOD FOR OPTICALLY DETECTING ARCING FAULTS IN ELECTRIC POWER SYSTEMS IN THE PRESENCE OF OTHER LIGHT SOURCES

BACKGROUND OF THE INVENTION

1. Field of the Invention

This invention relates to detecting arcing faults in electric power systems utilizing the light emitted by the arcing even in the presence of other light sources. More particularly, it relates to such apparatus and method energized by the emitted light without external power and uses a low-cost optic fiber for communication to central electronics.

2. Background Information

Electric power systems incorporate switches for control and protection purposes. Distribution systems which form part of the overall electric power system include main and branch power buses and circuit breakers mounted in metal cabinets to form switchgear. Interruption of current flow in the buses of the distribution system by a circuit breaker creates an arc as the contacts of the circuit breaker open. These arcs caused by interruption are contained and extinguished in the normal course of operation of the circuit breaker.

At times, however, unintended arcing faults can occur within the switchgear cabinets, such as between the buses, or between a bus and a grounded metal component. Such arcing faults can produce high-energy gases which pose a threat to the structure and nearby personnel. A common approach to protecting personnel from arcing faults in switchgear has been to design the metal enclosures to withstand the blast from the arcing fault. This has been done at great additional cost due to the heavy gauge metal used and numerous weld joints needed to prevent flying debris. Even with these precautions, the blast from an arcing fault inside the switchgear cannot always be fully contained.

Recently, methods have been developed for minimizing the severity of the blast from an internal arcing fault. These methods include pressure sensing and light detection which sense the arcing fault within the switchgear and cause a circuit breaker to trip before significant damage can result. The pressure sensing method is limited by the insensitivity of the pressure sensors. By the time cabinet pressure has risen to detectable levels, the arcing fault has already caused significant damage. The light detection methods used to date are not selective so that any light signal can trigger the sensor. Thus, a flashlight used by service personnel, or sunlight or a photoflash can false trigger the optical sensor. In order to avoid such false tripping of the optical sensors, it has been proposed that optical sensing be combined with current sensing either directly or by sensing the magnetic field created by the current. Unfortunately, these methods are costly and have not proved to be reliable.

U.S. Pat. No. 6,229,680 discloses apparatus and a method for optically detecting arcing faults in electric power systems in the presence of other light sources. Light from components in the electric power system is gathered and split into two light beams. The first beam is passed through a first narrow band filter to extract a wavelength characteristic of arcing in the material, such as copper in switchgear conductors. The second beam of light is passed through a second filter having a narrow bandwidth, not including the characteristic wavelength. The extracted light signals are converted to a sensed light electrical signal and a background light electrical signal, respectively, by photodiodes and compared. If the sensed light electrical signal exceeds the background light electrical signal by a selected threshold, an output device such as a trip solenoid is actuated. While effective, this arrangement requires a bifurcated optic fiber bundle with a separate pair of optic fibers for each component monitored. These fiber optic cables are fragile and expensive. In addition, the optics at the light-gathering end of the optic fibers provide a limited field of view. An alternative arrangement placing the photodiodes close to each of the components to be monitored requires power to be distributed to each of these photo detectors and also provides a narrow field of view.

There is a need for an improved apparatus and method for detecting arcing in electric power system components which is economical and does not require expensive special optic fibers, and which preferably, is self-energized by the arcing, thereby eliminating the need for distribution of power.

SUMMARY OF THE INVENTION

The present invention provides an improved apparatus and method for detecting arcing faults in electric power distribution systems even in the presence of other sources of light. A sensor unit includes first photovoltaic means that is responsive to incident light in a first wavelength band including the predetermined wavelength of light produced by an arcing fault to generate a sensed light electrical signal. Second photovoltaic means of the sensor unit generates a background light electrical signal from incident light including light from the component in a second wavelength band not including the predetermined wavelength. Circuit means connects the first photovoltaic means and the second photovoltaic means to an electrically activated light-emitting device with the sensed light electrical signal and the background light electrical signal in opposition to activate the light-emitting device to emit a light signal when the sensed light electrical signal exceeds the background light electrical signal by a selected threshold amount indicative of an arcing fault. A response unit includes an optic fiber transmitting the light signal from the light-emitting device of the sensor unit, and photoelectric means responsive substantially only to the light signal transmitted by the optic fiber for generating an arcing signal in response to the light signal. As the optic fiber is primarily transmitting a digital light signal and providing electrical isolation between the sensor unit and the output arcing signal, it can be a low-cost device. Furthermore, the sensor unit which can be duplicated throughout the electric power system is self-energizing thereby eliminating the need for the distribution of activating power. In addition, the photovoltaic means have a wide field of view thereby eliminating the need for optics to ogather light, or alternatively, reducing the number of sensor units required.

Each of the photovoltaic means can comprise at least one photovoltaic cell and filter means, the first photovoltaic means having a filter with a passband equal to the first wavelength band containing the predetermined wavelength generated by an arcing fault, and the filter for the second photovoltaic means having a passband equal to the second wavelength which does not include the predetermined wavelength of an arcing fault.

In an alternative embodiment, a bias electrical signal is added to the signal generated by the first photovoltaic cell. This bias electrical signal can be generated by one or more additional photovoltaic cells which add their electrical output to the electrical output of the first photovoltaic cell so that the light-emitting device is biased towards its operating point, and therefore, the size or number of filtered photovoltaic cells can be reduced to reduce costs.

The method in accordance with the invention comprises extracting from light from the component, light in a first wavelength band including the predetermined wavelength generated by an arcing fault and applying the light in this first wavelength band to a first photovoltaic cell to generate a sensed light electrical signal. Light in a second wavelength band not including the predetermined wavelength is also extracted from light from the component and applied to at least one second photovoltaic cell to generate a background light electrical signal. The background light electrical signal is subtracted from the sensed light electrical signal and a detector light signal is generated when the sensed light signal exceeds the background light electrical signal by a predetermined threshold amount. A photoelectric device is exposed to the detector light signal to generate an arc fault signal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
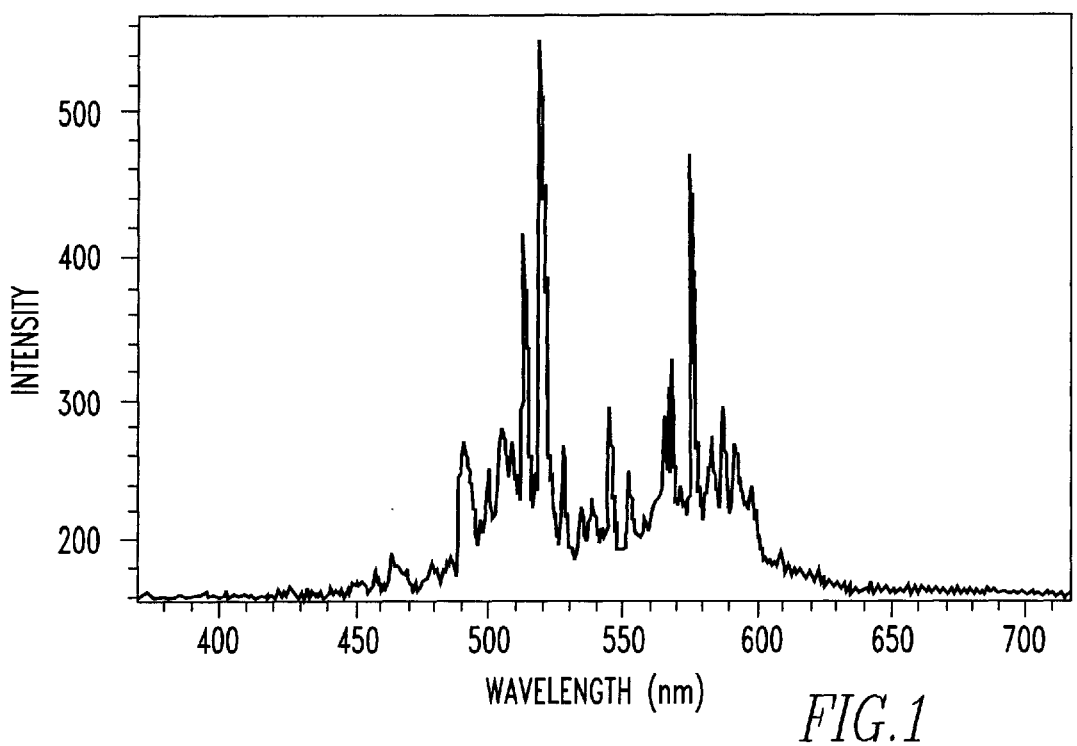
FIG. 1 is a spectral irradiance curve for a copper arc.
Figure 2:
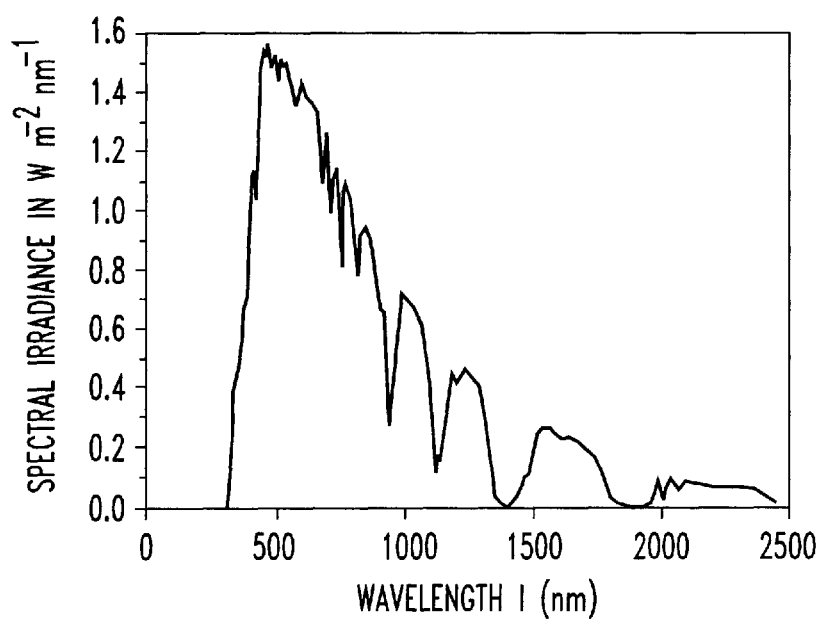
FIG. 2 is a spectral irradiance curve for sunlight.

Like the apparatus in U.S. Pat. No. 6,229,680, the invention relies upon the fact that arcing faults in electric power systems generate light characteristic of the arcing material. For instance, in electric power systems, this material is typically the copper used in the conductors. An example of the spectrum of a copper arc is illustrated in FIG. 1. As shown, there are several emission lines with a strong peak occurring at 521.820 nm. There are other relatively strong emission lines between about 490 nm and 590 nm; however, there is relatively little activity at 600 nm and above. Unfortunately, other sources of light that could be present in the environment being monitored also emit light including some of the same wavelengths. For instance, as shown in FIG. 2, sunlight has a rather broad spectrum, and while it has a strong emission line at about 520 nm, it still has a strong emission at around 600 nm. Other sources of light that could be present such as, for instance, fluorescent light, a tungsten lamp, a flashlight, and a photoflash, have substantial irradiance at 600 nm and relatively little radiance at about 520 nm. In accordance with the invention, two bandwidths of light are selected to detect the presence of arcing and to discriminate arcing from other light sources. For this purposes filters with selected passbands are utilized. The first filter is selected to have a passband which includes a wavelength characteristic of the arcing material, copper in the example.

Thus, the first filter is selected to have a passband which includes 521.82 nm. The second filter is selected to have a passband which includes a wavelength not including the characteristic wavelength. In the exemplary apparatus, this filter is selected to have a passband centered at about 600 nm. The widths of each of the passbands is selected to produce a suitable compromise between sensitivity and discrimination. This bandwidth can be up to about 25 nm, but is preferably about 5 to 10 nm. The narrower the bandwidth, the more discriminating is the detection, but the sensitivity is reduced as the bandwidth narrows.

Figure 3:
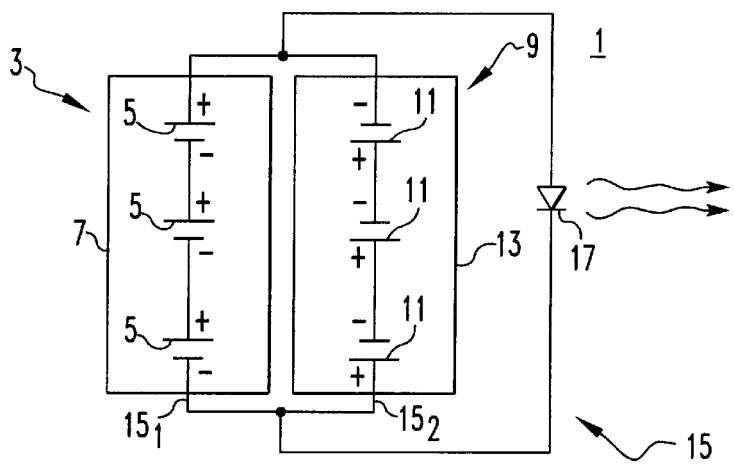
FIG. 3 is a schematic diagram of a sensor in accordance with the first embodiment of the invention.

The arcing fault detector of the invention utilizes photovoltaic cells in a sensor unit. One form of the sensor unit 1 is illustrated in FIG. 3. The sensor unit 1 includes the first photovoltaic device 3 including at least one, or a plurality of series connected photovoltaic cells 5, and a first filter 7 which filters light incident upon the photovoltaic cells 5. This first filter 7 has a passband centered on the characteristic wavelength, e.g., 521.820 nm, of the arcing material.

The sensor 1 includes a second photovoltaic device 9 which also includes one or more series connected photovoltaic cells 11 and a second filter 13 which filters light incedent upon the photovoltaic cells 11 and has a passband that does not include the characteristic wavelength of the arcing material, e.g., centered on about 600 nm in the exemplary system.

The first photovoltaic device 3 generates a sensed light electrical signal in response to the filtered incident light, and similarly, the second photovoltaic device 9 generates a background light electrical signal with an amplitude dependent upon the irradiance of light in the passband of the second filter 13. An electric circuit 15, having a first branch 15$_1$ connecting the first photovoltaic cells 3 in series and a second branch 15$_2$ similarly connecting the second photovoltaic cells 11 in series, connects these two electrical signals in opposition to a light-emitting device such as a light-emitting diode (LED) 17. When arcing is present, the sensed light electrical signal generated by the first photovoltaic device 3 exceeds the background light electrical signal generated by the second photovoltaic device 9 by a threshold amount sufficient to turn on the LED 17. While in the absence of arcing, the first photovoltaic device 3 will generate a sensed light electrical signal due to some irradiance in the passband of the first filter 7, it will be insufficient to overcome the reverse bias effect of the background light signal generated by the second photovoltaic device 9 on the LED 17. In fact, where the background light is fluorescent, from an incandescent bulb or a flashlight all of which have very low irradiance in the passband of the first filter 7, but significant irradiance in the passband of the second filter 13, the background light electrical signal will significantly exceed the sensed light electrical signal and strongly reverse bias the LED 17. The filters 7 and 13 can be interference filters, although lower cost bandpass filters could also be utilized.

Figure 4A:
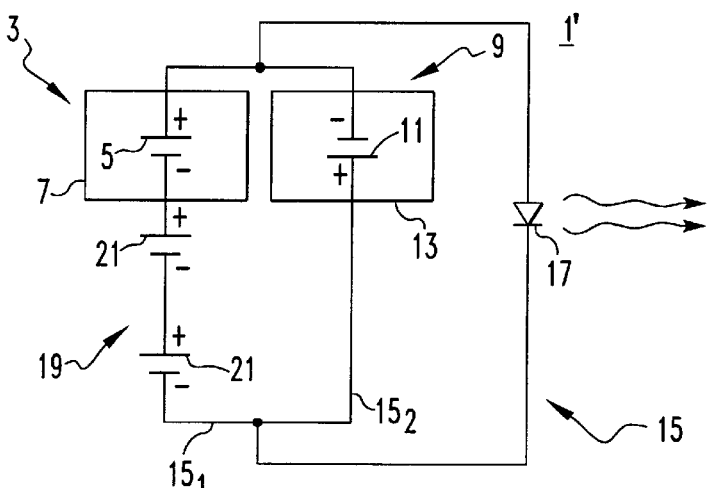
FIG. 4A is a schematic diagram of a sensor in accordance with the second embodiment of the invention.
Figure 4B:
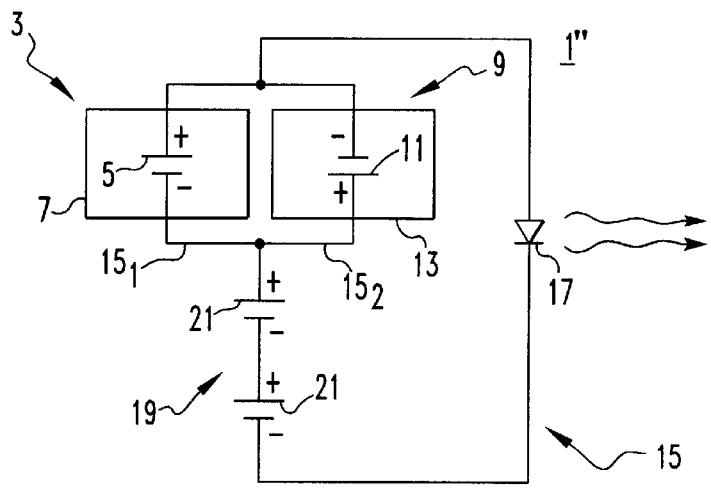
FIG. 4B is a schematic diagram of a modified form of the embodiment illustrated in FIG. 4A

An alternate embodiment of the sensor unit 1' shown in FIG. 4A adds a bias generator 19 in the form of one or more additional photovoltaic cells 21 connected in series with the first photovoltaic device 3 in the first branch 15$_1$ of the electrical circuit 15. This puts a forward bias on the LED 17 so that fewer or smaller filtered photovoltaic cells 5 and 11 can be used. This also reduces the size and therefore the cost of the filters 7 and 13. As the additional photovoltaic cells 21 are not provided with filters, the total cost of the sensor is reduced. The embodiment of FIG. 4A can be modified as shown in FIG. 4B to place the bias generating cells 21 of the sensor 1" in series with both filtered photovoltaic cells 5 and 11, but still provide the same effect of forward biasing the LED 17.

Through their utilization of photovoltaic cells 5, 11 and 21, the sensors 1 and 1' of FIGS. 3 and 4 are self-energized. In addition, the photovoltaic cells have a larger field of view, even without optics, than the bifurcated fiber optic cables used in the earlier optical arcing detector discussed above in the Background Information section.

Figure 5:
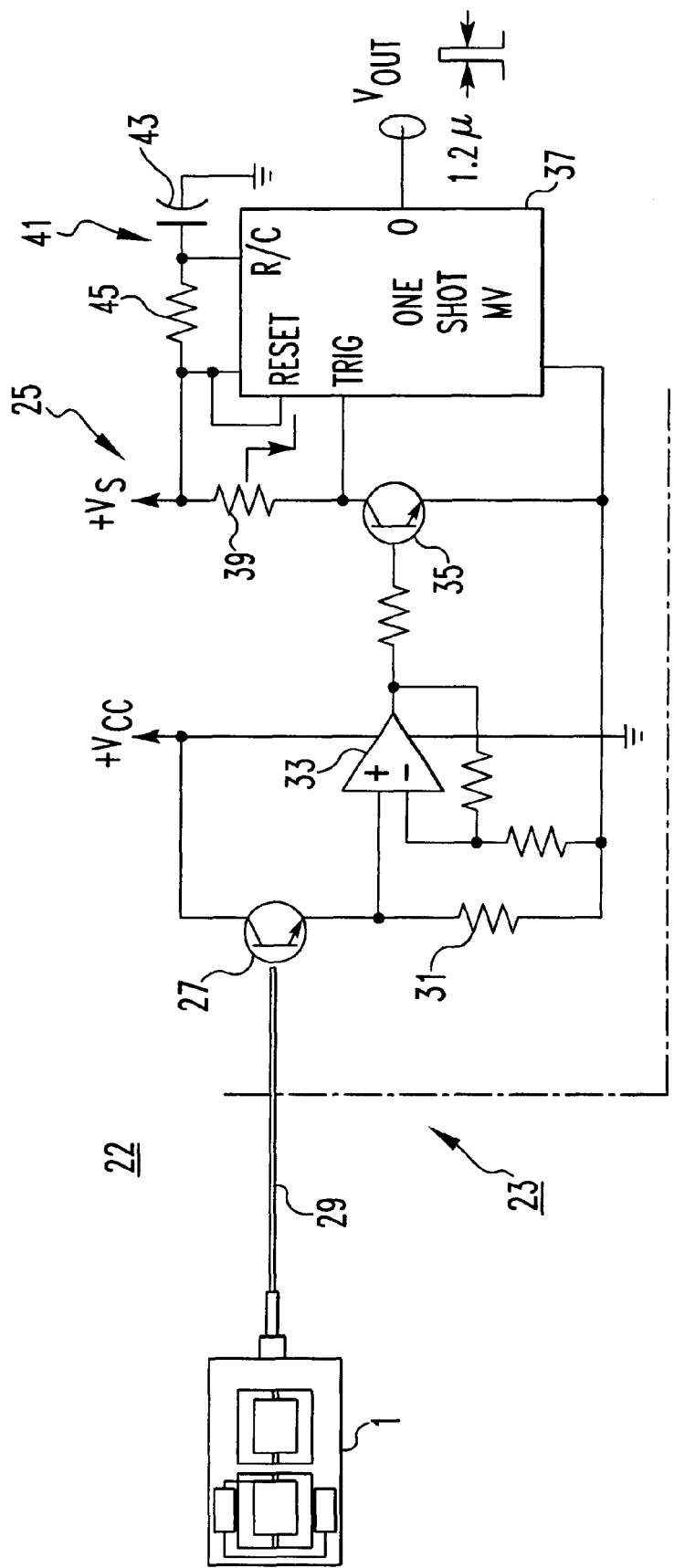
FIG. 5 is a schematic diagram of apparatus in accordance with the invention including a schematic circuit diagram of the electronics.

FIG. 5 illustrates the arcing fault detector 22 of the invention. The sensor unit 1 (or 1') is connected to a response device 23 which includes a photoelectric circuit 25. This photoelectric circuit includes a photo diode 27 which is activated by the light signal generated by the sensor 1. The light signal is transmitted from the sensor 1 to the photo detector 27 by an optic fiber 29. This permits the photoelectric circuit 25 to be remotely located from the component being monitored where the arcing fault detector is used, for instance, in medium voltage switchgear. This removes the photoelectric circuit 25 from the vicinity of the medium voltages, such as for instance 15 KV, that could otherwise produce electromagnetic interference in the electronics. Thus, the optic fiber 29 provides electrical isolation for the photoelectric circuit 25. As the light signal generated by the sensor 1 is essentially a digital signal, that is it is on when an arcing fault is detected and off in the absence of arcing, a low-cost optic fiber is suitable for performing the dual functions of transmitting this digital optical signal and providing electrical isolation for the photo-electric circuit 25.

The photodetector 27 is energized by a suitable dc supply voltage such as $+V_{CC}$. The light signal generated by the LED 17 in the presence of arcing turns on the photo detector 27 which causes current to flow through the resistor 31. The voltage across this resistor 31 generated by the current is amplified by the op amp 33 sufficiently to turn on a transistor 35. The transistor 35 provides the trigger signal to a one-shot multi-vibrator 37. Normally, the transistor 35 is off so that a pull-up resistor 39 applies $+V_S$ to the trigger input of the one-shot multi-vibrator 37. When the sensor provides a light signal through the optic fiber 29 to turn on the photodetector 27, the transistor 35 is turned on pulling the trigger input of the one-shot multi-vibrator 37 essentially down to ground. This causes the output Q of the multi-vibrator $V_{out}$ to go high. An RC circuit 41 formed by the capacitor 43 and resistor 45 resets the one-shot multi-vibrator 37 to go low again so that $V_{out}$ is a pulse signal. The arcing fault signal represented by $V_{out}$ can be used to set an alarm, and/or trip a circuit breaker, or otherwise initiate protective or notification action. The time constant of the RC circuit 41 is selected to produce a pulse of sufficient duration to actuate the desired output device.

Figure 6:
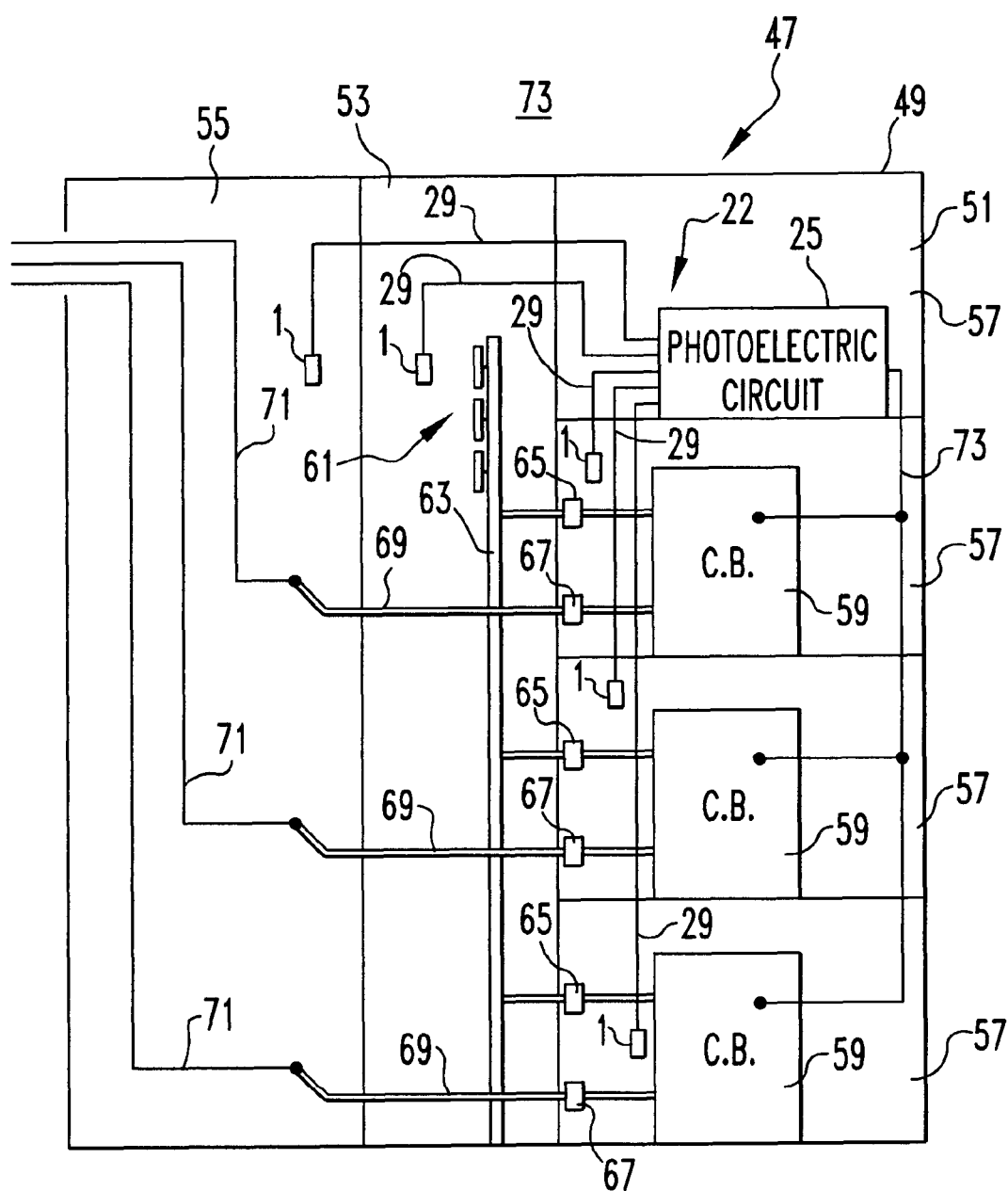
FIG. 6 is a diagram illustrating application of the invention to arc protection in switchgear.

FIG. 6 illustrates schematically an application of the optical arcing fault detector 22 of the invention to distribution systems switchgear. The switchgear 47 includes a metal switchgear cabinet 49. Typically, the cabinet 49 is divided into a forward-compartment 51, a middle compartment 53, and a rear compartment 55. Forward compartment 51 is divided vertically in to cells 57 in which are housed electrical switching apparatus such as circuit breakers 59. The middle compartment 53 houses rigid buses including a horizontal three-phase bus 61 which is connected to a set of vertical buses (only one visible) 63. The vertical buses are connected to the circuit breakers 59 through upper quick disconnects 65. Lower quick disconnects 67 connect the circuit breakers through runbacks 69 to cables 71 extending from the rear compartment 55.

The optical arcing fault detector 22 of the invention can be used to protect the switchgear 47 from arcing faults which can occur between any of the conductors 61–71 or between such conductors and the metal cabinet 49. Thus, sensors 1 can be inserted into the cells 57, the middle compartment 53 and the rear compartment 55 where they can monitor for arcing faults. Each of the sensors 1 is connected by an optic fiber 29 to the photoelectric circuit 25 that can be contained in the top-most cell 57 of the forward compartment 51 or any other convenient location. Upon detection of an arcing fault, the arc signal generated by the photoelectric circuit 25 can be applied as a trip signal through a trip lead 73 to each of the circuit breakers 59 or to a high-speed shorting switch (not shown). The arcing signal can also be sent as a trip signal to a main circuit breaker (not shown) which would de-energize the incoming bus 61 and/or to a remote monitoring station (also not shown).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. Apparatus for detecting an arcing fault at a component of an electric power system where the arcing fault generates light at a predetermined wavelength in the presence of light from other sources which may include the predetermined wavelength, the apparatus comprising:
    a sensor unit comprising:
        first photovoltaic means for generating a sensed light electrical signal from incident light including light from the component in a first wavelength band including the predetermined wavelength;
        second photovoltaic means for generating a background light electrical signal from incident light including light from the component in a second wavelength band not including the predetermined wavelength;
        an electrically activated light-emitting device for emitting a light signal when electrically activated; and
        circuit means connecting the first photovoltaic means and the second photovoltaic means to the light-emitting device with the sensed light electrical signal and the background light electrical signal in opposition to electrically activate the light-emitting device to emit the light signal when the sensed light electrical signal exceeds the background light electrical signal by a threshold amount indicative of an arcing fault; and
    a response unit comprising:
        an optic fiber transmitting the light signal from the light-emitting device; and
        photoelectric means responsive substantially only to the light signal transmitted by the optic fiber for generating an arcing signal in response to the light signal.

2. The apparatus of claim 1, wherein the first photovoltaic means comprises at least one photovoltaic cell and first filter means between the at least one first photovoltaic cell and the component and having a pass band equal to the first wavelength band, and wherein the second photovoltaic means comprises at least one second photovoltaic cell and second filter means between the at least one second photovoltaic cell and the component and having a pass band equal to the second wavelength band.

3. The apparatus of claim 2, wherein the at least one first photovoltaic cell comprises a plurality of photovoltaic cells, the at least one second photovoltaic cell comprises a plurality of second photovoltaic cells, and the circuit means comprises a first branch connecting the plurality of first photovoltaic cells in series and a second branch connecting the plurality of second photovoltaic cells in series with the first and second branches connected in parallel to the light-emitting device.

4. The apparatus of claim 2, wherein the sensor unit further includes bias means for generating a bias electrical signal in response to ambient light and the circuit means connects the bias means to add the bias electrical signal to the sensed light electrical signal.

5. The apparatus of claim 4, wherein the bias means comprises at least one third photovoltaic cell.

6. A method of detecting an arcing fault at a component in an electric power system where the arcing fault generates light at a predetermined wavelength in the presence of light from other sources which may include the predetermined wavelength, the method comprising:

extracting from light from the component and any of the other sources present, light in a first wavelength band including the predetermined wavelength and applying the light in the first wavelength band to at least one first photovoltaic cell to generate a sensed light electrical signal;

extracting from light from the component and any of the other sources present, light in a second wavelength band not including the predetermined wavelength and applying the light in the second wavelength band to at least one second photovoltaic cell to generate a background light electrical signal;

subtracting the background light electrical signal from the sensed light electrical signal;

generating a detector light signal when the sensed light electrical signal exceeds the background light electrical signal by a predetermined threshold amount; and exposing a photoelectric device to the detector light signal to generate an arc fault signal.

7. The method of claim 6, wherein exposing the photoelectric device to the detector light signal comprises transmitting the detector light signal to the photoelectric device through an optic fiber.

8. Apparatus for detecting an arcing fault at a component of an electric power system where the arcing fault generates light at a predetermined wavelength in the presence of light from other sources which may include the predetermined wavelength, the apparatus comprising:

a sensor unit responsive to incident light including light from the component generating a light signal only when the incident light contains light in a first passband including the predetermined wavelength that exceeds light in the incident light in a second passband not including the predetermine wavelength by a selected amount, the sensor unit being powered only from the incident light; and response means comprising a photoelectric device responsive to the light signal to generate an electrical arcing fault signal.

9. The apparatus of claim 8 wherein the response means further includes an optic fiber transmitting the light signal from the sensor unit to the photoelectric device.

10. The apparatus of claim 9 including a plurality of sensor units each responsive to light from a different component within the electric power system, and a plurality of optic fibers each transmitting the light signal generated by a sensor unit to the photo electric device which is operated to generate the arcing signal in response to the light signal from any of the plurality of sensor units.

11. The apparatus of claim 10 wherein the sensor unit comprises:

first photovoltaic means for generating a sensed light electrical signal from incident light including light from the component in a first wavelength band including the predetermined wavelength;

second photovoltaic means for generating a background light electrical signal from incident light including light from the component in a second wavelength band not including the predetermined wavelength;

an electrically activated light-emitting device for emitting a light signal when electrically activated; and circuit means connecting the first photovoltaic means and the second photovoltaic means to the light-emitting device with the sensed light electrical signal and the background light electrical signal in opposition to electrically activate the light-emitting device to emit the light signal when the sensed light electrical signal exceeds the background light electrical signal by a threshold amount indicative of an arcing fault.

* * * * *